(12) United States Patent
Johnson et al.

(10) Patent No.: US 10,633,022 B2
(45) Date of Patent: Apr. 28, 2020

(54) TRACK-TYPE MACHINE PROPULSION SYSTEM HAVING INDEPENDENT TRACK CONTROLS INTEGRATED TO JOYSTICKS

(71) Applicant: Caterpillar SARL, Geneva (CH)

(72) Inventors: Terril James Johnson, Washington, IL (US); Brad Robert Van De Veer, Washington, IL (US); Corey Lee Gorman, Peoria, IL (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/990,238

(22) Filed: May 25, 2018

(65) Prior Publication Data

US 2019/0359257 A1    Nov. 28, 2019

(51) Int. Cl.

| | |
|---|---|
| *B62D 11/00* | (2006.01) |
| *E02F 9/20* | (2006.01) |
| *E02F 9/16* | (2006.01) |
| *E02F 3/32* | (2006.01) |
| *G05G 9/047* | (2006.01) |
| *E02F 3/42* | (2006.01) |
| *B60K 17/10* | (2006.01) |
| *B62D 11/06* | (2006.01) |
| *F16H 61/47* | (2010.01) |
| *F16H 61/438* | (2010.01) |
| *F15B 11/16* | (2006.01) |
| *B62D 55/06* | (2006.01) |

(52) U.S. Cl.
CPC ............ *B62D 11/003* (2013.01); *B60K 17/10* (2013.01); *B62D 11/06* (2013.01); *B62D 55/06* (2013.01); *E02F 3/32* (2013.01); *E02F 3/425* (2013.01); *E02F 9/16* (2013.01); *E02F 9/2004* (2013.01); *F15B 11/16* (2013.01); *F16H 61/438* (2013.01); *F16H 61/47* (2013.01); *G05G 9/047* (2013.01); *F15B 2211/6346* (2013.01); *F15B 2211/7053* (2013.01); *F15B 2211/71* (2013.01); *G05G 2009/04774* (2013.01)

(58) Field of Classification Search
USPC ......................................................... 701/50
See application file for complete search history.

(56) References Cited

U.S. PATENT DOCUMENTS 2,958,131 A * 11/1960 Keene ..................... B44B 11/02
                                                  409/130
4,716,399 A * 12/1987 Nordlund ................. G01D 5/26
                                                  250/234

(Continued)

FOREIGN PATENT DOCUMENTS

| GB | 2437756 B | 4/2010 |
|---|---|---|
| JP | 2000-204599 A | 7/2000 |

(Continued)

*Primary Examiner* — Jean Paul Cass

(57) ABSTRACT

A track-type machine includes first and second ground-engaging track assemblies, each having a drive motor, and a propulsion system including an operator station with first and second joysticks, and a travel control system including input devices resident on the first and second joysticks. The input devices are adjustable to vary at least one of a speed or a direction of the drive motors in the track assemblies. Adjustment of the drive motor speed can be in proportion to an adjustment of the corresponding input device.

17 Claims, 4 Drawing Sheets

(56) References Cited

U.S. PATENT DOCUMENTS

| | | | | |
|---|---|---|---|---|
| 5,694,153 | A * | 12/1997 | Aoyagi | G05G 9/047 345/156 |
| 5,772,672 | A * | 6/1998 | Toy | A61B 17/0469 606/139 |
| 5,963,195 | A * | 10/1999 | Gregg | G06F 1/1616 345/159 |
| 6,061,004 | A * | 5/2000 | Rosenberg | G06F 3/016 341/20 |
| 6,216,029 | B1 * | 4/2001 | Paltieli | A61B 8/0833 600/427 |
| 6,556,150 | B1 * | 4/2003 | McLoone | G06F 3/03549 341/20 |
| 6,903,723 | B1 * | 6/2005 | Forest | A61F 4/00 345/157 |
| 6,936,978 | B2 * | 8/2005 | Morgan | G01R 15/08 315/291 |
| 7,050,041 | B1 * | 5/2006 | Smith | G06F 3/0312 345/156 |
| 7,528,835 | B2 * | 5/2009 | Templeman | A63F 13/00 345/474 |
| 8,380,402 | B2 | 2/2013 | Hobenshield | |
| 8,700,271 | B2 | 4/2014 | Evenson et al. | |
| 9,002,595 | B2 * | 4/2015 | Davis | B60W 10/103 477/34 |
| 9,993,166 | B1 * | 6/2018 | Johnson | A61B 5/0205 |
| 10,004,451 | B1 * | 6/2018 | Proud | A61M 21/02 |
| 2002/0002354 | A1 * | 1/2002 | Vetter | A61M 5/3202 604/272 |
| 2002/0166267 | A1 | 11/2002 | McGugan | |
| 2006/0185185 | A1 * | 8/2006 | Scarborough | G01B 3/1084 33/759 |
| 2007/0156225 | A1 * | 7/2007 | George | A61F 2/95 623/1.12 |
| 2008/0074395 | A1 * | 3/2008 | Rak | G06F 1/1626 345/168 |
| 2012/0065847 | A1 * | 3/2012 | Hobenshield | G05G 9/04785 701/50 |
| 2013/0018254 | A1 * | 1/2013 | Drucker | A61B 5/489 600/424 |
| 2014/0064897 | A1 * | 3/2014 | Montgomery | E02F 3/434 414/685 |
| 2014/0079519 | A1 * | 3/2014 | Hobenshield | E02F 3/4075 414/694 |
| 2015/0253806 | A1 | 9/2015 | Astrom et al. | |
| 2016/0153166 | A1 * | 6/2016 | Gentle | E02F 3/844 172/781 |

FOREIGN PATENT DOCUMENTS

| | | |
|---|---|---|
| JP | 2003-301805 A | 10/2003 |
| WO | 2011021150 A1 | 2/2011 |

* cited by examiner

TRACK-TYPE MACHINE PROPULSION SYSTEM HAVING INDEPENDENT TRACK CONTROLS INTEGRATED TO JOYSTICKS

TECHNICAL FIELD

The present disclosure relates generally to track-type machine propulsion systems and, more particularly, to a travel control system for a track-type machine having joysticks with integrated track controls.

BACKGROUND

Many different track-type machines are known and used throughout the world. Track-type tractors typically include ground-engaging tracks positioned at each side of a rigid frame, and are typically equipped with a front implement such as a dozing blade or a bucket, and sometimes a back implement such as a ripper or the like. Excavators generally include a main frame with ground engaging tracks at each side thereof, and a rotating upper structure that supports a hydraulically actuated implement system, commonly including a boom, a stick, and a bucket. Front shovels, military vehicles, mining machines, and various other types of specialized equipment also employ ground-engaging tracks.

A great many different designs are also known for controlling speed and travel direction of track-type machines. It is typically necessary for one track to rotate faster than the other track, or in an opposite direction, to turn the machine. Steering wheels, levers, and foot pedals have all been implemented in various forms for operator control of speed and travel direction in track-type machines. In one known excavator design, for example, independent controls for operation of the left track and the right track independently are commonly used. Foot pedals for this purpose are provided on the floor in front of where the operator sits. This enables the operator to use his or her feet to move the machine while leaving their hands free to operate implement or other controls. Attached to the pedals are two long levers with hand grips. The hand grips provide an additional inter face to control travel by use of the hands. Some operators, particularly less experienced operators, may experience challenges in operating boom, stick, bucket, and swing or cab rotation controls all at the same time or in rapid sequence. Manipulation of controls with the feet can also be inherently more challenging due to the lesser dexterity of the feet in controlling fine movements in comparison with the hands. The foot pedals can also impact visibility to a primary working space when equipped with hand levers. U.S. Pat. No. 8,700,271 proposes a track-type tractor with an operator control station supported on the machine body and including a conveyance control joystick and a separate implement control joystick. A dozing blade is attached to a machine body. In the '271 patent, manipulating the implement control joystick enables an operator to raise or lower the dozing blade with respect to the machine body. The strategy set forth in the '271 patent has application at least to certain types of track-type machines and implement systems, but there is always room for improvement and further innovations in this field.

SUMMARY OF THE INVENTION

In one aspect, a propulsion system for a track-type machine includes an operator station having a first joystick movable among a plurality of joystick orientations relative to a first axis, and a second joystick movable among a plurality of joystick orientations relative to a second axis. A travel control system in the propulsion system includes a first input device resident on the first joystick and adjustable among a plurality of first device configurations, and a second input device resident on the second joystick and adjustable among a plurality of second device configurations. The travel control system further includes a drive motor control mechanism coupled with the first input device and the second input device. The drive motor control mechanism is structured to command varying at least one of a speed or a direction of a first drive motor coupled with a first ground-engaging track in the track-type machine in response to adjustment of the first input device among the plurality of first device configurations. The drive motor control mechanism is further structured to command varying at least one of a speed or a direction of a second drive motor coupled with a second ground-engaging track in the track-type machine in response to an adjustment of the second input device among the plurality of second device configurations.

In another aspect, a track-type machine includes a frame, a first track assembly having a ground-engaging track and a first drive motor, and a second track assembly having a ground-engaging track and a second drive motor. The machine further includes an operator station having a first joystick movable relative to a first axis, and a second joystick movable relative to a second axis. The track-type machine further includes a travel control system having a first input device resident on the first joystick and adjustable among a plurality of first device configurations, and a second input device resident on the second joystick and adjustable among a plurality of second device configurations. The travel control system further includes a drive motor control mechanism coupled with the first input device and the second input device and structured to vary at least one of a speed or a direction of the first drive motor and the second drive motor in response to adjustment of the first input device and the second input device, respectively, among the plurality of first device configurations and the plurality of second device configurations.

In still another aspect, a joystick for a propulsion system in a machine includes a shaft defining a joystick axis, and a handle including a handle body having a first axial end receiving the joystick shaft, and a second axial end. The handle body further has a leading side, a trailing side, an inboard side, and an outboard side. The inboard side forms an inwardly extending thumb rest having a lower surface that slopes away from the joystick axis and away from the first axial end, a contoured upper surface that slopes toward the joystick axis and toward the second axial end, and an inner face that extends between the lower surface and the contoured upper surface. An input device is mounted within the thumb rest and partially recessed from the inner face such that the input device is positioned for thumb actuation, and is movable from a neutral position in a positive direction toward the leading side of the handle, and in a negative direction toward the trailing side of the handle.

DETAILED DESCRIPTION

Figure 1:
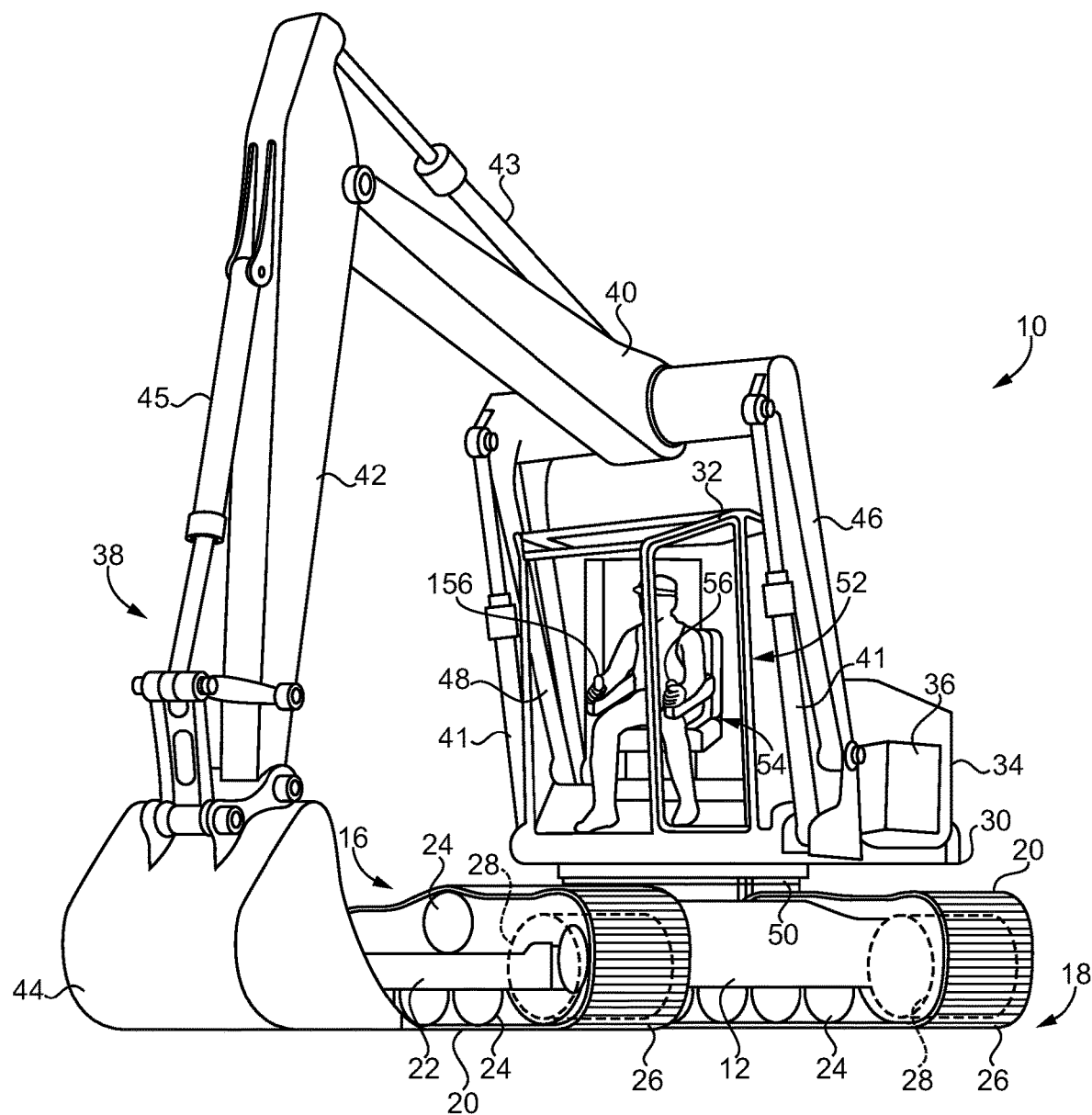
FIG. 1 is a diagrammatic view of a machine, according to one embodiment.

Referring to FIG. 1, there is shown a track-type machine 10 according to one embodiment. Machine 10 is illustrated in the context of an excavator, and includes a base frame 12 with a front frame end 16, a back frame end 18, and ground-engaging track assemblies 20 positioned at each side of base frame 12. Each ground-engaging track assembly (hereinafter "track assembly") 20 can include a track roller frame 22 supporting a plurality of rotatable elements 24 including track rollers, a carrier roller, an idler, and a drive sprocket, for example. A ground-engaging track 26 formed of a plurality of track shoes in a conventional manner extends about the corresponding plurality of rotatable elements 24. Each track assembly 20 further includes a drive motor 28, including a hydraulic motor or an electric motor, structured to power a corresponding drive sprocket (not shown). An upper structure 30 is supported upon base frame 12 by way of a rotatable connector 50. Upper structure 30 may be generally of a known design including an operator cab 32, and an engine compartment 34 with an internal combustion engine, such as a compression ignition diesel engine, housed therein. One or more hydraulic pumps and/or an electrical generator may be powered by way of internal combustion engine 36 to provide hydraulic pressure or electrical power to drive motors 28. Those skilled in the art will appreciate that various hydraulic and electrical connections may be formed by rotatable connector 50, such that upper structure 30 has a limitless range of rotation relative to base frame 12 and track assemblies 20.

Machine 10 further includes a hydraulically actuated implement system 38 including a boom 40, a stick 42, and an implement 44. In the illustrated embodiment implement 44 includes a bucket. In alternative strategies implement 44 could include a hydraulically actuated or pneumatically actuated hammer, a grapple, an auger, a front shovel, or any of a variety of other implements. A hydraulic actuator 45 is provided for actuating implement 44. A hydraulic actuator 43 is provided for actuating stick 42. One or more hydraulic actuators 41 are also provided for actuating boom 40. In the illustrated embodiment, boom 40 has a first boom branch 46 located upon a first side of operator cab 32 and a second boom branch 48 located upon a second side of operator cab 32. An operator station 54 may be located on or within operator cab 32. In other embodiments rather than a branched boom, a single piece boom might be used, positioned to one side of operator cab 32. In still other instances machine 10 might have a different configuration altogether. As will be further apparent from the following description machine 10 is uniquely configured for independent control of track assemblies 20 by way of joystick integrated input devices in a manner providing advantages over prior strategies.

To this end, operator station 54 is part of a propulsion system 52 for machine 10 and includes a first joystick 56 movable among a plurality of joystick orientations, and a second joystick 156 movable among another plurality of joystick orientations. Operator station 54 can include other controls and systems and devices such as a seat, a display screen, communications equipment, and still other equipment. It can be noted from the illustration of FIG. 1 that an operator's field of view is unobstructed in a forward direction by way of machine or implement controls, with operator station 52 and implement system 38 generally being situated along a centerline of upper structure 30 and, depending upon a presents orientation of upper structure 30 relative to base frame 12, positionable upon a centerline of machine 10/base frame 12 that extends longitudinally between front frame end 16 and back frame end 18 between track assemblies 20.

Figure 2:
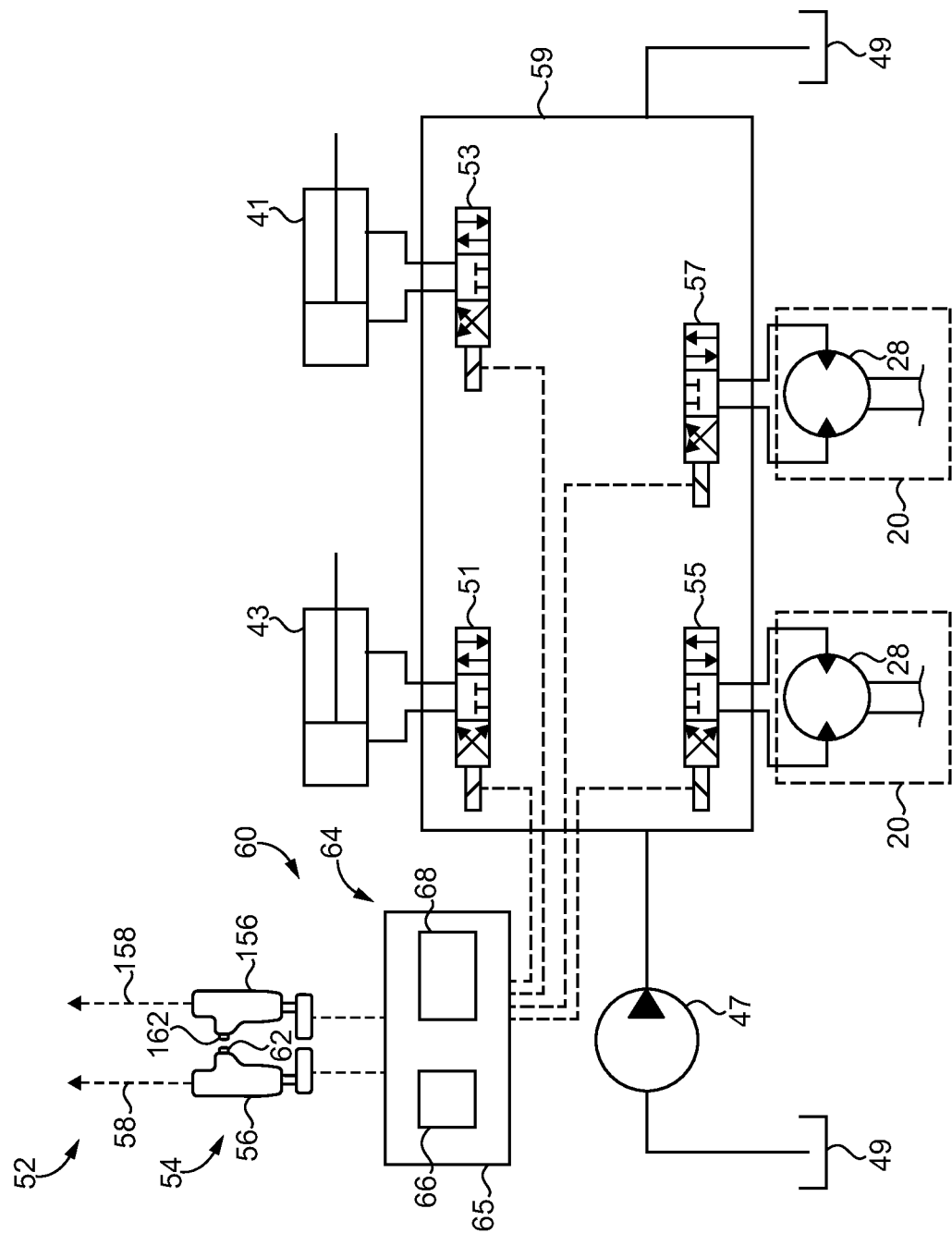
FIG. 2 is a diagrammatic view of parts of the machine of FIG. 1.

Referring also now to FIG. 2, there are shown additional components and elements of propulsion system 52, and wherein it can be seen that first joystick 56 is movable among a plurality of joystick orientations relative to a first axis 58, and second joystick 156 is movable among a plurality of joystick orientations relative to a second axis 158. It should be appreciated that axis 58 and axis 158 may be defined by a joystick base, or some other external reference. Joystick 58 and joystick 158 may each define a joystick axis as further discussed herein, and also labeled with reference numerals 58/158, since the reference axes around which joysticks 56 and 156 are moved will be the same as joystick axes themselves when joysticks 56 and 156 are neutrally positioned. Also shown in FIG. 2 are actuators 41 and 43, and drive motors 28 in track assemblies 20. Other hydraulic actuators are omitted merely for clarity. Implement system 38 also includes one or more hydraulic pumps 47, a hydraulic fluid tank 49, and pressure and flow control components 59 that deliver hydraulic fluid at a suitable flow rate and pressure to actuate hydraulic actuators 41 and 43 and drive motors 28. A first valve 51 is coupled between hydraulic pump 47 and actuator 43 whereas a second valve 53 is positioned between hydraulic pump 47 and actuator 41. Another valve 55 is positioned between hydraulic pump 47 and a first one of drive motors 28, and yet another valve 57 is positioned between hydraulic pump 47 and the other one of drive motors 28. It will be appreciated that various additional components such as a charge pump, pressure sensors, flow restrictors, accumulators, potentially pilot valves, check valves, fluid conduits and pressure communication lines, and other features of pressure and flow control components 59 might be included in a practical implementation, but are not here illustrated as they are of generally known design. Each of valves 51, 53, 55, and 57 may be electronically controlled by way of an electronic control unit 65 having a processor 66 and a memory 68. Processor 66 can include any suitable central processing unit such as a microprocessor or a microcontroller. Memory 68 can include any suitable memory such as RAM, ROM, SDRAM, FLASH memory, a hard drive, et cetera, and may store computer executable instructions for controlling drive motors 28 and computer executable instructions for controlling implement system 38.

As discussed above, drive motors 28 may be independently controllable to vary speed and/or direction of track assemblies 20. Propulsion system 52 includes a travel control system 60 having a first input device 62 resident on joystick 56 and adjustable among a plurality of first device configurations, and a second input device 162 resident on second joystick 156 and adjustable among a plurality of second device configurations. Travel control system 60 further includes a drive motor control mechanism 64 coupled with first input device 62 and second input device 162. Drive motor control mechanism 64 can be understood to include electronic control unit 65 or electronic control unit 65 and pressure and flow control components 59. In an electrically powered propulsion system according to present disclosure a drive motor control mechanism could include an electronic control unit, or an electronic control unit plus electrical power circuitry coupled between an electrical power source such as a generator, a battery or a fuel cell, and electric drive motors. Drive motor control mechanism 64 may be structured to command varying at least one of a speed or a direction of a first one of drive motors 28 coupled with a first one of track assemblies 20 in response to adjustment of first input device 62 among the plurality of first device configurations. Drive motor control mechanism 64 may also be structured to command varying at least one of a speed or a direction of a second one of drive motors 28 coupled with the second one of track assemblies 20 in machine 10 in response to an adjustment of the second input device 162 among the plurality of second device configurations. The commands can include electrical current commands, or potentially voltage commands or digital signals, to the appropriate valves or valve actuators, to effect desired motor speeds and/or directions. An electric drive machine could be operated analogously with control commands sent to electrical power circuitry to vary electrical current and/or voltage to electric drive motors.

Figure 3:
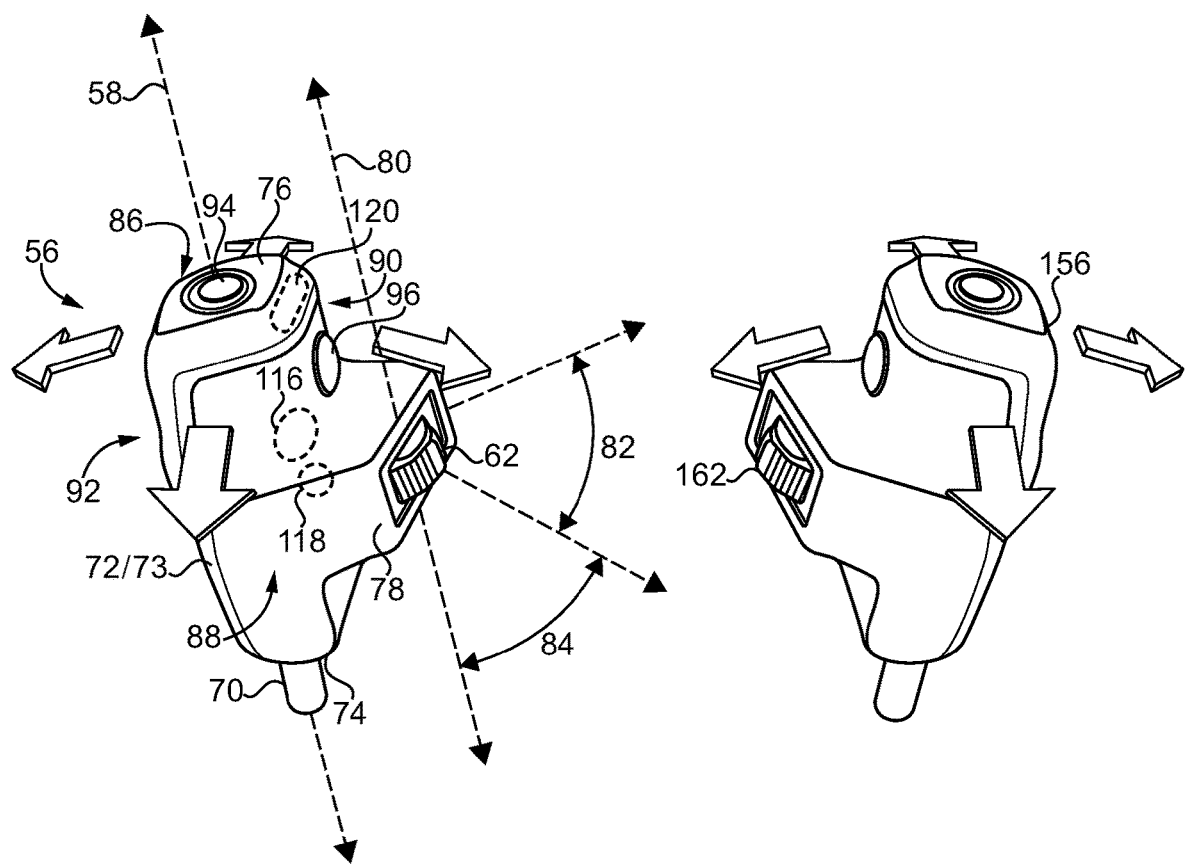
FIG. 3 is a diagrammatic view of joysticks for an operator station in a propulsion system for a track-type machine, according to one embodiment.

Referring also now to FIG. 3, there are shown joysticks 56 and 156 in further detail. It will be recalled that each of joystick 56 and joystick 156 is movable among joystick orientations relative to axis 58 and axis 158, respectively. Arrows shown in FIG. 3 depict forward, rearward, left, and right directions in which joystick 56 and joystick 156 can be moved. In one implementation, moving of joystick 56 and joystick 156 about the respective axes 58 and 158 controls implement system 38. Joystick 56 could be moved forward and aft for stick control and left and right for swing or rotation control. Joystick 156 could be moved forward and aft for boom control and left and right for bucket control, for example. Additional input devices can be provided on joystick 56 and joystick 156 as well. Another input device 94 can be used to operate the machine's horn, for example. Another input device 96 can be operated to store information about what machine 10 or implement system 38 is doing. Still other functions could be provided by still other input devices 116, 118, and 120. Input device 120 might provide mid-pressure ATT control, input device 116 might provide a standby condition control or a payload weigh function control, and input device 118 might provide a one-way ATT control. High-pressure ATT control, bucket recall and store, benchmark, grade and bucket assist activation, and laser and tough point functions are example functions that might be activated, deactivated, varied, or otherwise controlled with various input devices on joystick 56 or joystick 156. It should also be appreciated that the discussion herein of joystick 56 and its various input devices and features will be understood by way of analogy to apply to joystick 156, and joysticks 56 and 156 will typically be mirror images. It should also be appreciated that these various features and functions are set forth herein for purely illustrative purposes, and those skilled in the art will appreciate a great many different additional features and functions and input device configurations that might be implemented depending upon machine type, customer specifications, and operator preferences. Grade control, roto tilt features, auto digging, navigation, and still other functions that could be controlled using joystick 56 and joystick 156 will be readily apparent.

It will be recalled that input device 62 and input device 162 may be used to control speed and direction of track assemblies 20. It should also be appreciated that in some instances the purpose and effect of controlling input device 62 and input device 162 could be changed. For instance, in one operating scheme, such as a digging scheme, input device 62 and input device 162 could perform the track control functions described. In another operating scheme, for example a roading or travel scheme, input device 62 and input device 162 might perform different functions or no function at all. An operator could switch among the various schemes or control modes. In a practical implementation strategy, the plurality of first device configurations of input device 62 and the plurality of second device configurations of input device 162 can each include positions or orientations defining a track control range. In FIG. 3 it can be seen that input device 62 is rotatable among the corresponding plurality of first device configurations in a positive direction from a neutral state defining a range 82, or in a negative direction from a neutral state defining a range 84. In the illustrated embodiment, input device 62 includes a thumb wheel that is rotated forward from a neutral state such that range 82 includes a forward portion of the track control range, and is rotated rearward from the neutral state, approximately as shown, such that range 84 includes a negative portion of the track control range. Operation of input device 162 can be understood to be substantially identical to the described operation of input device 62 albeit in a mirror image manner. In the illustrated embodiment input device 62 and input device 162 each include a thumb wheel, however, it should be appreciated that other implementations could include different types of input devices such as triggers, sliders, levers, or still other suitable input devices.

In a practical implementation strategy, drive motor control mechanism 64 is structured by way of operating input device 62 and input device 162 to vary directions of drive motors 28 in response to an adjustment of the corresponding first input device 62 or second input device 162 between a positive portion and a negative portion of its track control range. Drive motor control mechanism 64 is further structured to vary speeds of drive motors 28 in proportion to a relative extent of adjustment of first input device 62 and second input device 162. Accordingly, it can be appreciated that rotating input device 62 about an axis 80 from a neutral state through range 82 can vary a speed of a corresponding one of drive motors 28. Rotating input device 62 in an opposite direction from the neutral state, through range 84, can vary a speed of a corresponding one of drive motors 28 in an opposite direction. Transitioning input device 62 between range 82 and range 84 reverses a direction of rotation of the corresponding one of drive motors 28. The speed of the corresponding one of drive motors 28 that is produced in response to an adjustment of input device 62 can be directly proportional to the relative extent of adjustment. For instance, with input device 62 at the neutral state, approximately as is shown in FIG. 3, the corresponding one of drive motors 28 will be at rest. If input device 62 is rotated halfway through range 82 then the corresponding one of drive motors 28 will be rotated at approximately 50 percent of a max speed. Analogously if input device 62 is rotated halfway through range 84 from its neutral state rotation of the corresponding one of drive motors 28 in a reverse direction will occur at approximately 50 percent of a max speed. Rotating input device 62 to the extremes of its available range of orientations about axis 80 will produce maximum speeds. It should also be appreciated that the orientation of axis 80 is shown substantially perpendicular to an orientation of axis 58. Input device 62 can thus be understood to rotate in a horizontal plane depending upon the orientation of joystick 56 itself. In other instances, input device 62 could rotate in a tilted plane or potentially even a vertical plane. It can also be noted that range 82 and range 84 might each be about 22.5 degrees, for a total track control range of about 45 degrees. In other implementations a range of rotation of input device 62 might be greater than 45 degrees, or less than 45 degrees. It is also contemplated that modulating drive motor speed might not be directly proportional to a relative extent of adjustment of input device 62. For instance, while a 25% forward rotation of input device 62 to produce a 25% increase in forward speed of the associated drive motor 28 is a practical implementation strategy, embodiments would still fall within the scope of the present disclosure where the relationship between input device position or orientation and speed result is non-linear.

Figure 5:
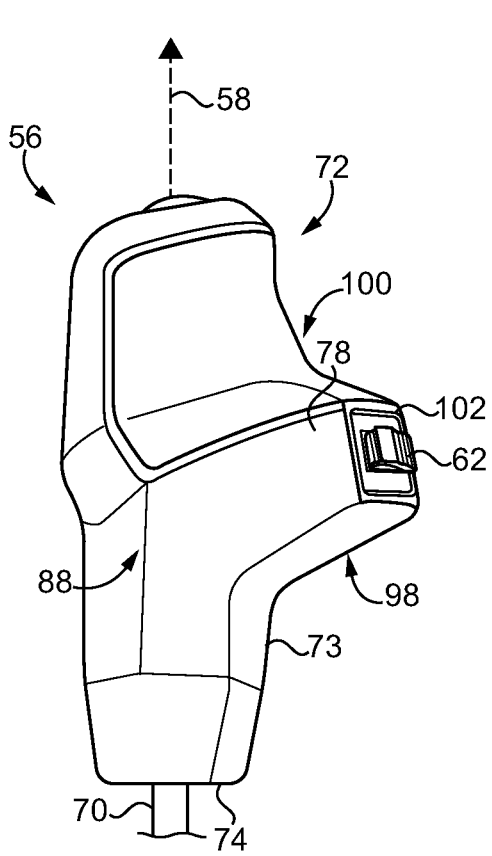
FIG. 5 is a diagrammatic view of a joystick according to one embodiment, from a first viewpoint.
Figure 6:
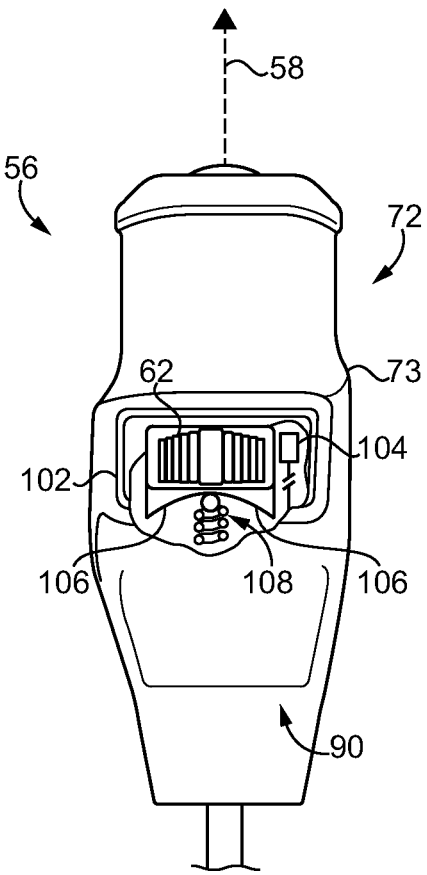
FIG. 6 is a diagrammatic view of the joystick of FIG. 5 rotated to a different viewpoint.

It can also be seen from FIG. 3 that joystick 56 includes a joystick shaft 70 and a joystick handle 72 mounted upon joystick shaft 70. It will also be appreciated that while joystick axis 58 is shown extending longitudinally through joystick shaft 70 and joystick handle 72, as discussed above joystick axis 58 may be externally defined such as by a joystick base assembly, and therefore joystick handle 72 will be tilted from axis 58 when manipulated according to the directional arrows depicted in FIG. 3. Joystick handle 72 includes a handle body 73 having a first axial end 74 receiving joystick shaft 70, a second axial end 76, with handle body 73 further defining a leading side 86, a trailing side 88, an inboard side 90, and an outboard side 92. Referring also now to FIG. 5, there are shown features of joystick 56 in further detail. Inboard side 90 forms an inwardly extending thumb rest 78. Thumb rest 78 has a lower surface 98 that slopes away from axis 58 and away from first axial end 74. Thumb rest 78 also has a contoured upper surface 100 that slopes toward joystick axis 58 and toward second axial end 76, and an inner face 102. Inner face 102 may be substantially planar and extends between lower surface 98 and upper surface 100. Upper surface 100 can be seen to curve circumferentially around joystick axis 58 toward trailing side 88. Contoured upper surface 100 is understood as contoured in the sense that contoured upper surface 100 has a surface shape that varies in three dimensions throughout at least a part of its vertical extent and a part of its horizontal extent. Lower surface 98 could likewise be contoured. Input device 62 is mounted within thumb rest and partially recessed from inner face 102 such that input device 62 is positioned for thumb actuation, and movable from its neutral position or neutral state in a positive direction toward leading side 86, and in a negative direction toward trailing side 88. Referring also now to FIG. 6, there is shown joystick 56 as it might appear viewing inboard side 90, and partially open to show features associated with input device 62. Joystick 56 can further include an electrical transducer 104 coupled with input device 62 and adjustable among a range of electrical states in proportion to a relative location of input device 62 between a forward position and a back position as discussed herein. Electrical transducer 104 could include an inductive device, a capacitive device, a potentiometer, or any other suitable position or proximity sensing device. It can also be seen that input device 62 includes a ramp 106 that is in contact with a biaser 108. Biaser 108 could include a spring-and-ball biaser that imparts a tendency for input device 62 to settle to a neutral state or neutral position. Electrical transducer 104 can output a signal to electronic control unit 65 that is indicative of a position of input device 62 to enable speed and direction control as discussed herein.

Figure 4:
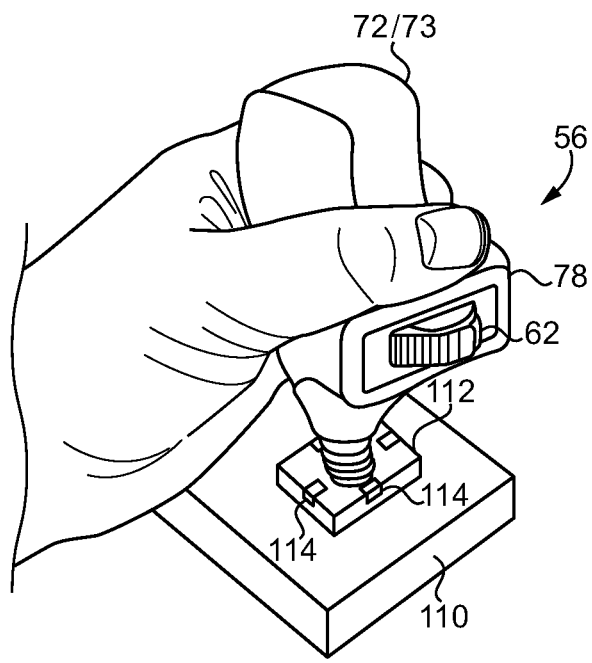
FIG. 4 is a diagrammatic view of a joystick shown grasped by a user's hand, according to one embodiment.

Referring now to FIG. 4, there is shown joystick 56 as it might appear grasped by a user with the user's thumb resting upon thumb rest 78. The user's hand wraps generally circumferentially around much of handle body 73. It can also be noted that handle body 73 has a roughly polygonal shape such that the operator can, based upon feel alone, have a sense of forward, rearward, and side-to-side directions in contrast to other joysticks having shapes that are directionally indistinct. The operator can rest his or her thumb upon thumb rest 78 and manipulate joystick 56 and its other input devices to perform the various functions apart from traveling that are discussed herein. When it is desirable to use joystick 56 for traveling or track control the operator can drop his or her thumb into contact with input device 62 and roll it forward or backward. Also shown in FIG. 4 is a base assembly 110 coupled with shaft 70 and supporting joystick 56. Base assembly 110 may include a plurality of switches or the like 114 in a fourth input device that includes a transducer 112. Transducer may be structured to produce a signal based on an orientation or a change in orientation of joystick 56, such as an angle of shaft 70, relative to base assembly 110. Moving joystick 56 forward or back, left or right, et cetera, and potentially twisting joystick 56 clockwise or counterclockwise are therefore actions that can be detected by transducer assembly 112 and communicated to electronic control unit 65 for the various purposes contemplated herein.

INDUSTRIAL APPLICABILITY

Referring to the drawings generally, but in particular now back to FIG. 1, machine 10 is shown as it might appear where an operator is seated at operator station 54 and manipulating joysticks 56 and 156 to operate implement system 38. When it is desirable to move machine 10 to a different location at a worksite, or simply to reposition machine 10 to continue operating in the same general area, the operator can utilize input device 62 and input device 162 to operate drive motors 28, producing a combination of track speeds and track directions of the first and second track assemblies. Machine 10 and propulsion system 52 could be operated to move machine 10 in a straight line to the left or to the right, along a trench or edge of a roadway, for example. Thus, a first combination of track speeds and track directions could be the same or similar speeds of the tracks, in the same directions of advancement about the corresponding notable elements. To effectuate operation where speed and direction of each of track assemblies 20 are substantially the same, input device 62 and input device 162 can be positioned at or moved to substantially identical relative positions in their respective track control ranges. In other instances, where machine 10 is to be moved in a curving path, the combination of track speeds and track directions might include unequal speeds but the same directions. In such a case, input device 62 and input device 162 could be positioned at or moved to different relative positions within their respective track control ranges. In still other instances, a given combination of track speeds and track directions could include unequal track speeds and opposite directions, or the same or similar track speeds and opposite directions, in each instance the operator controlling the operation by varying input device 62 and/or input device 162 among the plurality of available device configurations.

When machine 10 is to be moved again, or where travel speed or travel direction is to be varied, configurations of first input device 62 and second input device 162 can be varied such that operation of drive motors 28 is commanded by way of electronic control unit 65, with suitable repositioning of valves 55 and 57, and any other valves associated with drive motor speed or direction, occurring as described herein. With operation of the drive motors varied, track assemblies 20 may operate such that a different or second combination of track speeds and track directions different from the first combination of track speeds and track directions is attained. It will therefore be appreciated that an operator, or potentially an autonomous controller, can independently control the speeds and directions of track assemblies 20 to move machine forward, back, along a curving path, or even rotating. At the same time various other machine and implement parameters can be adjusted, without any need for an operator to take his or her hands off of joysticks 56 or 156, or even reposition the hands, with the track speed and direction control effected with the operator's thumbs.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A propulsion system for a track-type machine having a first drive motor coupled with a first ground-engaging track, and a second drive motor coupled with a second ground-engaging track, the propulsion system comprising:
   an operator station including a first joystick movable among a plurality of joystick orientations relative to a first axis, and a second joystick movable among a plurality of joystick orientations relative to a second axis;
   each of the first joystick and the second joystick defining a joystick axis, and including a handle having a first axial end, a second axial end, a leading side, a trailing side, and an inboard side;
   the respective inboard sides facing one another and each forming an inwardly extending thumb rest spaced from the corresponding first axial end and second axial end; and
   a travel control system including a first input device mounted in the thumb rest of the first joystick and a second input device mounted in the thumb rest of the second joystick;
   each of the first input device and the second input device being adjustable in a positive direction from a neutral position toward the leading side of the corresponding handle, and in a negative direction from a neutral position toward the trailing side of the corresponding handle, and biased toward the neutral position;
   the travel control system further including a drive motor control mechanism coupled with the first input device and the second input device, wherein the first drive motor is at rest when the first input device is at the neutral position and the second drive motor is at rest when the second input device is at the neutral position, and the drive motor control mechanism being structured to:
   command varying of the first drive motor and the second drive motor in forward directions in response, respectively, to adjustment of the first input device and the second input device in the positive direction; and
   command varying a speed of the first drive motor and the second drive motor in reverse directions in response, respectively, to adjustment of the first input device and the second input device in the negative direction from the neutral position.

2. The propulsion system of claim 1 wherein:
   each of the first input device and the second input device is rotatable in the positive direction or the negative direction.

3. The propulsion system of claim 1 wherein the drive motor control mechanism is further structured to vary directions of the first drive motor and the second drive motor in response to an adjustment of the corresponding first input device or second input device from the neutral position to a positive portion and a negative portion of a track control range.

4. The propulsion system of claim 1 wherein each of the first input device and the second input device includes a thumbwheel mounted within the thumb rest.

5. The propulsion system of claim 1 wherein the drive motor control mechanism is further structured to vary the speeds of the first drive motor and the second drive motor in proportion to a relative extent of adjustment of the corresponding first input device or second input device in the positive direction or the negative direction.

6. A track-type machine comprising:
   a frame;
   a first track assembly having a ground-engaging track and a first drive motor;
   a second track assembly having a ground-engaging track and a second drive motor;
   an operator station including a first joystick movable relative to a first axis, and a second joystick movable relative to a second axis;
   each of the first joystick and the second joystick including a handle having a first axial end, a second axial end, and an inboard side forming a thumb rest that projects in an inboard direction away from an inboard side of the handle and is spaced from the first axial end and the second axial end;
   a travel control system including a first input device resident on the first joystick and mounted in the thumb rest and being adjustable among a plurality of first device configurations, and a second input device resident on the second joystick and mounted in the thumb rest and being adjustable among a plurality of second device configurations;
   the plurality of first device configurations and the plurality of second device configurations each include forward positions and back positions where the corresponding first input device or second input device is adjusted, respectively, in a positive direction from a neutral position toward a leading side of the handle and in a negative direction from the neutral position toward a trailing side of the handle, and each of the first input device and the second input device is biased toward the neutral position; and
   the travel control system further including a drive motor control mechanism coupled with the first input device and the second input device and structured to vary at least one of a speed or a direction of the first drive motor and the second drive motor in response to adjustment of the first input device and the second input device, respectively, between the forward position and the back position, and each of the first drive motor and the second drive motor is at rest when the corresponding first input device or second input device is at the neutral position.

7. The track-type machine of claim 6 further comprising a hydraulically actuated implement system including an implement control mechanism coupled with the first joystick and the second joystick and structured to vary a position of a first valve and a second valve in response to moving of the first joystick and the second joystick, respectively, about the first axis and the second axis.

8. The track-type machine of claim 7 wherein the hydraulically actuated implement system further includes a hydraulically actuated boom having a first boom branch located upon a first side of the operator station and a second boom branch located upon a second side of the operator station, and an implement coupled to the boom.

9. The track-type machine of claim 7 wherein each of the first drive motor and the second drive motor includes a hydraulic motor.

10. The track-type machine of claim 6 wherein each of the first input device and the second input device is rotatable in a track control range from the neutral position.

11. The track-type machine of claim 10 wherein each of the first input device and the second input device includes a thumbwheel.

12. The track-type machine of claim 10 wherein the drive motor control mechanism is structured to vary directions of the first drive motor and the second drive motor in response to an adjustment of the first input device and the second input device, respectively, between a positive portion and a negative portion of its track control range.

13. The track-type machine of claim 10 wherein the drive motor control mechanism is further structured to vary speeds of the first drive motor and the second drive motor in proportion to a relative extent of adjustment of the first input device and the second input device.

14. A joystick for a propulsion system in a machine comprising:
a shaft defining a joystick axis;
a handle including a handle body having a first axial end receiving the joystick shaft, and a second axial end, and the handle body further having a leading side, a trailing side, an inboard side, and an outboard side;
the inboard side forming an inwardly extending thumb rest, projecting in an inboard direction away from the joystick axis and spaced from each of the first axial end and the second axial end, and having a lower surface that slopes away from the joystick axis and away from the first axial end, a contoured upper surface that slopes toward the joystick axis and toward the second axial end, and an inner face that extends between the lower surface and the contoured upper surface;
a first input device mounted within the second axial end; and
a second input device mounted within the thumb rest and partially recessed from the inner face such that the second input device is positioned for thumb actuation;
the second input device is movable from a neutral position in a positive direction toward the leading side of the handle, and in a negative direction toward the trailing side of the handle, and is biased toward the neutral position in opposition to movement in the positive direction or the negative direction.

15. The joystick of claim 14 wherein the input device is rotatable about an axis of rotation in the positive direction to a forward position and in the negative direction to a back position, and the axis of rotation is oriented substantially parallel to the joystick axis.

16. The joystick of claim 15 wherein the input device includes a thumb wheel, and further comprising a transducer coupled with the input device and adjustable among a range of states in proportion to a relative location of the thumb wheel between the forward position and the back position.

17. The joystick of claim 15 further comprising:
a third input device positioned upon the inboard side at a location that is between the thumb rest and the second axial end;
a base assembly coupled with the shaft; and
a fourth input device structured to produce a signal based on an orientation of the shaft relative to the base assembly.

* * * * *